United States Patent Office 3,008,992
Patented Nov. 14, 1961

---

3,008,992
PROCESS FOR RECOVERING N-METHYL-N-VINYLACETAMIDE
John W. Lynn, Charleston, and Bertrand D. Ash, St. Albans, W. Va., assignors to Union Carbide Corporation, a corporation of New York
No Drawing. Filed Dec. 2, 1959, Ser. No. 856,674
4 Claims. (Cl. 260—561)

This invention relates to a process for recovering N-methyl-N-vinylacetamide from a crude mixture of acetic acid and N-methyl-N-vinylacetamide.

In United States Patent 2,231,905, there is described a process for preparing an N-vinyl-N-alkyl tertiary amide by pyrolyzing an N-(2-acetoxyethyl)-N-alkylacetamide. This reaction may be represented as follows:

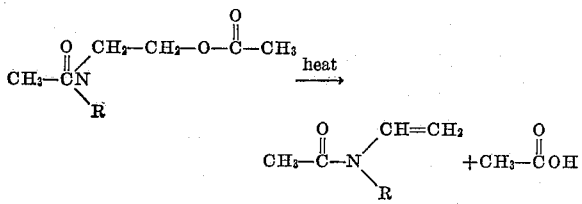

where R is an aliphatic group. The crude mixture so obtained contains, in addition to the acetic acid and N-vinyl-N-alkyl-acetamide, some unreacted N-(2-acetoxyethyl)-N-alkylacetamide, N-alkylacetamide and undistillable residue.

When this process is applied to N-(2-acetoxyethyl)-N-methylacetamide, considerable difficulty has been encountered in separating the resulting N-vinyl-N-methylacetamide from the crude mixture. Fractional distillation is not effective since N-vinyl-N-methylacetamide and acetic acid form an azeotrope or constant-boiling mixture. One method of effecting the separation is by distillation of the crude mixture to obtain a fraction consisting of acetic acid and N-vinyl-N-methylacetamide, treating this fraction with an alkali metal carbonate to form a highly water-soluble alkali metal salt of acetic acid and extracting the N-vinyl-N-methylacetamide from the aqueous solution with a water-immiscible organic liquid. This procedure, which is shown in Example 3 of U.S. Patent 2,231,905, suffers many disadvantages such as increased cost due to the additional operation required for the neutralization-extraction process, expense involved in using an alkali metal carbonate, the necessity of subsequently recovering acetic acid from the aqueous solution of its salt, and the resultant losses of the highly water-soluble N-vinyl-N-alkylacetamide in the extraction process.

Another possible means of separating N-methyl-N-vinylacetamide from a fraction consisting of N-vinyl-N-methylacetamide and acetic acid is by adding a compound to the mixture which forms a minimum-boiling azeotrope with acetic acid and separating this azeotrope from the N-vinyl-N-methylacetamide by distillation. This procedure, although more effective than the solvent extraction process previously discussed, suffers from the disadvantage that when a mixture of acetic acid and N-vinyl-N-methylacetamide is heated, the acetic acid catalyzes the formation of dimers and higher polymers of N-vinyl-N-methylacetamide. This effect may be represented as follows:

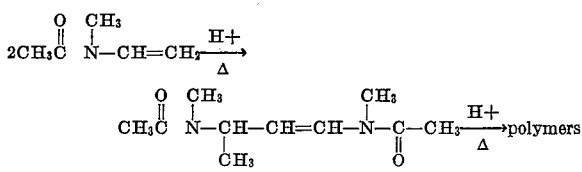

This effect is illustrated in Example 1, following. It has also been noted that heating N-vinyl-N-methylacetamide in the presence of acetic acid causes an evolution of acetaldehyde, thus indicating the susceptibility of N-vinyl-N-methylacetamide to acid-catalyzed hydrolysis as well as the above-described polymerization.

It is an object of this invention to provide a means for the efficient recovery of N-methyl-N-vinylacetamide from a mixture with acetic acid without the occurrence of the previously discussed undesirable side reactions.

The present invention is based on our discovery that the crude reaction mixture obtained by the pyrolysis of N-(2-acetoxyethyl)-N-methylacetamide may be treated with N-methylethanolamine to neutralize the acetic acid contained in the reaction mixture. This neutralization of acetic acid prevents the occurrence of undesirable side reactions so that the N-methyl-N-vinylacetamide contained in the reaction mixture may be easily removed by distillation. By this process, we are able to effect excellent product recovery of N-methyl-N-vinylacetamide from the reaction mixture.

It is also possible to flash off a mixture of N-methyl-N-vinylacetamide and acetic acid from the crude pyrolysis mixture, treat the distillate with N-methylethanolamine and distill off the N-methyl-N-vinylacetamide. Although any amount of N-methylethanolamine sufficient to neutralize the acetic acid may be added to the mixture, it is preferable to add it in approximately an equivalent amount to the amount of acetic acid in the mixture. The temperature during the neutralization may be held from about 10° C. to about 100° C., preferably from 40° C. to 80° C.

Another outstanding feature of this invention is that the use of N-methylethanolamine as the neutralizing agent makes it possible to merely treat the residual kettle material (i.e., the residue remaining after removing the N-methyl-N-vinylacetamide) with acetic anhydride to yield a mixture of the original starting material, N-(2-acetoxyethyl)-N-methyl acetamide and acetic acid. Distillation of the thus treated residual material thereupon provides the starting material for the next cracking, or pyrolysis step, plus acetic acid which is recovered as a saleable by-product.

Examples 2 and 3, following, are illustrative of this invention. Example 1 shows that in the presence of acetic acid, polymerization of N-methyl-N-vinylacetamide occurs when heated.

EXAMPLE 1

*Formation of N,N'-diacetyl-N,N'-dimethyl-1,3-diamino-1-butene and residues by acetic acid-catalyzed reaction of N-methyl-N-vinylacetamide*

N-(2-acetoxyethyl)-N-methylacetamide was fed through a Pyrex glass tube (22 mm. x 106 cm.) which was heated to 450° C. at a rate which gave a contact time of 15 seconds. The tube effluent (3619 grams) was distilled rapidly through a 1" x 8" Vigreaux column to give 3460 grams of distillate (boiling point, 40°/5 mm. to 125°/3 mm.), 63 grams of trap material and 73 grams of residues. The first distillate was then redistilled through a 1" x 12" packed column to give 1319 grams of a cut boiling from 65°/30 mm. to 90°/26 mm. which contained 42.9 percent acetic acid (by titration) and N-methyl-N-vinylacetamide. A total of 1928 grams of starting material was recovered as well as about 100 grams of N-methylacetamide, a by-product. About 50 grams of residues were obtained from this distillation. The N-methyl-N-vinylacetamide-acetic acid mixture was then distilled through a 1" x 66" packed column and about 400 grams of acetic acid were removed. At this point, it became difficult to separate the acetic acid and 2000 cm.³ of n-heptane was added to the kettle and distillation of the acetic acid had been removed over about a 15-hour period. The remaining heptane was then removed and N-methyl-N-vinylacetamide was distilled (boiling points, 62–63°/17 mm., 406 grams). A residue of 211 grams was obtained from this distillation, indicating that some condensation had occurred during the purification.

The residue was then distilled through a 1" x 6" Vigreaux column to give 146 grams of a slightly viscous liquid (boiling point, 130–142°/0.14 mm.; $n\ 30/D$, 1.5136; $d\ 30/30$, 1.0527; molecular weight, 199). Redistillation gave a refined product (boiling point, 129°/0.2 mm.; $n\ 30/D$, 1.5136) which was identified as N,N'-diacetyl-N,N'-dimethyl-1,3-diamino-1-butene.

*Analysis.*—Calculated for $C_{10}H_{18}N_2O_2$: C, 60.55; H, 9.15; N, 14.13. Found: C, 59.85; H, 9.03; N, 14.51. Molecular weight: Calculated—199. Found—198. Equivalent weight by hydrogenation: Calculated—199. Found—200.8.

Infrared and nuclear magnetic resonance spectra are consistent with the assigned structure.

An undistillable residue of 22 grams remained.

EXAMPLE 2

*Neutralization of N-methyl-N-vinylacetamide-acetic acid mixture with N-methylethanolamine*

To 5 cm.³ of N-methyl-N-vinylacetamide containing 1.1 percent acetic acid there was added 3 cm.³ of N-methylethanolamine. The mixture was heated for 1 hour on a steam bath. A color change to deep yellow-brown was the only visible sign of any reaction. In previous experiments in which no amine had been added, the mixture became very dark and viscous.

EXAMPLE 3

*Recovery of N-methyl-N-vinylacetamide from crude pyrolysis mixture*

N-(2-acetoxyethyl)-N-methylacetamide was fed through a Pyrex glass tube (22 mm. x 106 cm.) which was heated at 450° C. by a surrounding salt-heated steel tube at a rate which gave a contact time of 15 seconds.

A 500 gram portion of the pyrolysis mixture (13.45 percent as acetic acid=1.12 mols) was treated with 77.7 grams (1.064 mols) of N-methylethanolamine (temperature allowed to rise to about 50° C.) was then distilled.

| Cut | Boiling point | | $n\ 30/D$ | N-methyl-N-vinyl-acetamide, grams | N-methyl-acetamide, grams | Acetic acid, grams |
|---|---|---|---|---|---|---|
| | ° C. | Mm. | | | | |
| 1 | 38–45 | 4 | 1.4734 | 76 | | |
| 2 | 45–65 | 4 | 1.4722 | 6 | | |
| 3 | 65–80 | 2 | 1.4651 | 8 | 5 | |
| Trap | | | 1.4652 | 10 | | 3 |

A total of 100 grams, a 32.2 percent yield, of N-methyl-N-vinylacetamide was obtained.

The kettle contents were cooled to 60° C. and treated with 240 grams of acetic anhydride. Distillation was then continued.

| Cut | Boiling point | | $n\ 30/D$ | N-methylacetamide, grams | N-(2-acetoxyethyl)-N-methylacetamide, grams | Acetic acid, grams |
|---|---|---|---|---|---|---|
| | ° C. | Mm. | | | | |
| 4 | 42 | 22 | 1.3788 | | | 213 |
| 5 | 70–83 | 3 | 1.4239 | 8 | | |
| 6 | 80–55 | 1 | 1.4422 | 2 | 22 | |
| 7 | 85–91 | 1 | 1.4490 | | 32 | |
| 8 | 92 | 1 | 1.4515 | | 369 | |
| Trap residue | | | 1.3740 | | | 33 |
| Total | | | | 15 | 423 | 248 |

Assuming the mids cuts to be N-methylacetamide, a total of 15 grams, 6.5 percent yield, to this by-product was obtained.

A total of 423 grams of N-(2-acetoxyethyl)-N-methylacetamide was recovered for recycle, which gives an overall efficiency of 67.2 percent.

A total of 248 grams of acetic acid was recovered as by-product, which gives an 88.6 percent efficiency based on acetic acid.

The monomer, N-vinyl-N-methylacetamide, which is obtained by the process of this invention is valuable in the formation of water-soluble polymers which may be used in paper treatment, as coagulants, in textile treatment and as dye assistants.

What is claimed is:

1. A process for recovering N-methyl-N-vinylacetamide from a mixture comprising acetic acid and N-methyl-N-vinylacetamide which comprises adding N-methylethanolamine to the mixture to neutralize the acetic acid and distilling the N-methyl-N-vinylacetamide therefrom.

2. A process according to claim 1 wherein N-methylethanolamine is added to the mixture in an amount equivalent to the amount of acetic acid present.

3. A process according to claim 1 wherein the neutralization is conducted at a temperature of from about 10° C. to about 100° C.

4. A process according to claim 1 wherein the neutralization is conducted at a temperature of from about 40° C. to about 80° C.

References Cited in the file of this patent

UNITED STATES PATENTS 2,231,905    Hanford et al.    Feb. 18, 1941